Jan. 20, 1942.  G. M. MEINZINGER  2,270,759
TIRE REMOVING TOOL
Filed July 1, 1940
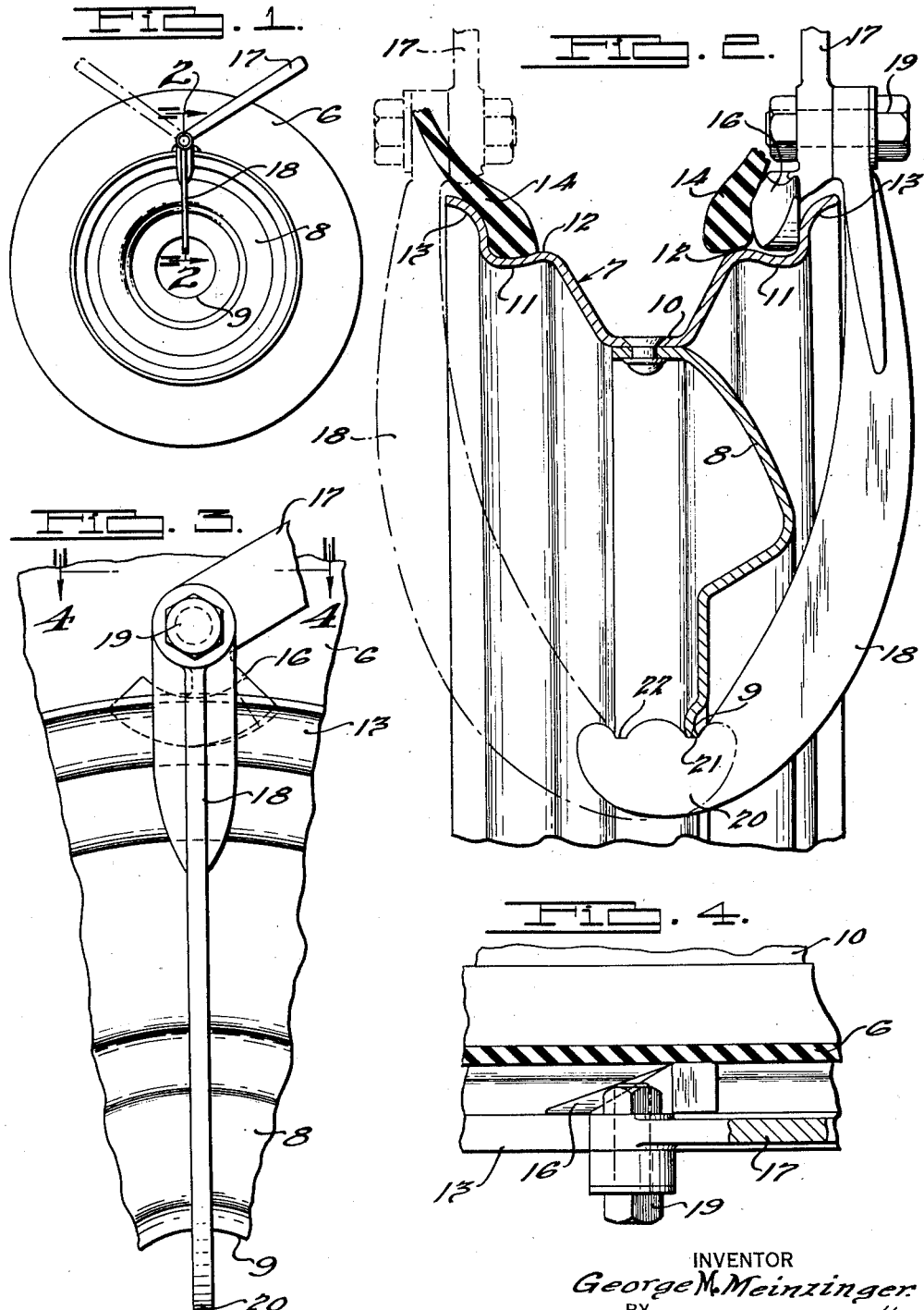
INVENTOR
George M. Meinzinger.
BY
ATTORNEYS.

Patented Jan. 20, 1942

2,270,759

UNITED STATES PATENT OFFICE 2,270,759

TIRE REMOVING TOOL

George M. Meinzinger, Rockwood, Mich., assignor to Ball & Ball Carburetor Company, Detroit, Mich., a partnership Application July 1, 1940, Serial No. 343,314

2 Claims. (Cl. 157—6)

My present invention relates to apparatus for removing pneumatic tire casings from wheel rims, particularly automobile tires from automobile wheels, and illustrates a further embodiment of the tool disclosed in my co-pending application Serial No. 287,429. The invention is of value with respect to a new type of tire rim having a conventional drop center portion and ridges along the edges of the drop center portion forming tire bead engaging troughs adjacent each flange of the rim in order that the beads of a tire casing may be more firmly maintained in position, the bead holding troughs being provided in order to hold the tire casing against accidental removal from the rim immediately following a blowout when the tire casing is in use on a vehicle in motion. A conventional tire may be applied to an improved rim of the type under consideration by slipping both beads of a tire at one side thereof into the drop center portion in order to accommodate stretching of the remaining portions of the beads of the tire casing over the rim and into the drop center portion, whereupon inflation of the tire to a pressure higher than normal pressure will expand the tire casing and force the beads of the tire into the bead holding troughs.

The present invention comprises a simple, inexpensive tool consisting of two forged or cast metal parts pivoted together whereby to form a unitary construction, the parts of which may not become separated and lost. The tool is very simple to operate, merely requiring the affixation of a clamp to the wheel assembly, the positioning of a bead moving share between the flange of the rim and the outer surface of the tire casing and the rotation of a share handle through an arc of approximately 90° whereupon the share forces a portion of the tire casing bead inwardly so that it may pass into the drop center portion of the rim. The tool may then be slid to an advanced position and again operated, several operations of the tool at spaced points around the tire rim being sufficient to dislodge the entire extent of the tire casing beads from the bead troughs of the rim.

The principal object of the invention is to devise a tool of the type previously discussed which is easily operated and inexpensively manufactured so as to be available to all owners and operators, in order that highway safety may be advanced by the use of bead trough rims.

Another object of the invention is to provide a tool of the foregoing type which may be operatively applied to a wheel assembly for the purpose above without marring the finish of the assembly parts.

A still further object of the invention is to provide a simple tool as aforesaid which can be operably applied to the wheel assembly including relatively offset parts.

Other objects and advantages of the invention will be more apparent from the following description taken in connection with the accompanying drawing, in which:

Fig. 1 discloses a tire and wheel assembly having a tool made in accordance with the present invention located thereon in the position of usage.

Fig. 2 is an enlarged sectional view of a portion of the tire casing and rim, showing the tool of the present invention in operation, the view being taken substantially along line 2—2 of Fig. 1.

Fig. 3 is a partial elevational view showing the tool in its initial position as located by the operator before the tool has functioned.

Fig. 4 is a partial plan view taken substantially along line 4—4 of Fig. 3 and looking in the direction of the arrows.

The invention is illustrated in connection with a wheel assembly including a pneumatic tire 6, a rim 7 and a disk-like center part 8 secured to the rim and offset laterally with respect thereto and having a central aperture indicated at 9. A tire rim of the type for which the present tool is particularly useful is disclosed in Fig. 2, the same comprising a deep drop center portion 10 which is provided for the purpose of facilitating removal of the tire from the rim. The drop center portion is bounded by tire bead holding troughs 11, the drop center portion and the tire bead holding troughs being joined by raised ridge portions 12. The outer edges of the rim are provided with the conventional flanges 13 which support the outer surfaces of the beads 14 of a tire casing 6. The rim is thus similar to conventional tire rims at present in use, with the addition of the ridges 12 between the drop center portion and the tire bead holding portions, which ridges define the inner edges of tire bead holding troughs 11 for the purpose of preventing accidental displacement of the tire beads.

The tool of the present invention comprises two parts, one part comprising a share 16 with an integral handle 17, and the other part comprising a rim clamp 18, the two parts being pivotally attached by means of a bolt and nut assembly 19. The handle 17 is offset with relation to the body of the share 16 so as to permit insertion of the foremost and narrow edge of the share into the angle between the flange 13 and the surface of the casing when the bead is in the trough 11, and the pivotal joint between the two parts of the tool will thereupon overlie the outer edge of the flange 13. The clamp 18 comprises a part having substantial rigidity bent slightly outwardly with respect to the assembly 19, then inwardly and downwardly so as to pass beneath the trough 11 when the tool is in position as previously described. The free end portion of the clamp 18 is bent to form a hook 20 having spaced notches 21 and 22 for receiving the edge of the wall bounding the opening 9. When the tool is applied to the opposite side of the assembly from that shown, the edge of the wall bounding the opening 9 is received in the notch 22, this being due to the center part 8 being offset. This arrangement serves to anchor the tool relative to the assembly and to position the share 16 for entrance between adjacent rim and tire side walls. The share 16 is preferably segmentally shaped with the pivot at its center of curvature so that the lower edge thereof defines an arc of a circle having a radius slightly less than the distance between the center of the pivot and the bottom of the trough 11 when the tool is in position and the outer wedging face of the share 16 may engage a substantial portion of the bead 14 in order to apply pressure thereto without marring the surface of the tire.

In order to operate the tool it is first placed against the tire rim and held in position with the edge of the wall bounding the opening 9 received in one of the notches 21, 22 of the hook 20, and the point of the share 16 engaged in the groove between the inner surface of the flange of the rim and the outer surface of the tire. Slight pressure will then hold the tool in position until the handle is rotated through an arc of substantially 90° to cause the share face to cam the bead 14 out of the groove 11 and over the ridge 12 so that it may pass into the drop center portion 10. Several operations of the tool will suffice to disengage enough of the bead of the tire from the bead holding trough to permit the tire to be removed from the rim.

The shape of the share 16 is such as to accomplish the needed camming action in a movement of approximately 90° in order that a long, inclined face may be used and so that extreme strength in operating the tool is not necessary. The share is also shaped so as to fit down into the trough 11 in order to permit engagement of the share face with the lower edge of the bead 14 so as to apply force to the bead opposite the ridge 12. It is obvious that details of the share may vary while achieving the same result, and that details of the clamp and hook portion may vary without altering the scope of the invention. All such modifications in detail and arrangement as come within the scope of the following claims are considered to be a part of my invention.

I claim:

1. In a tool for facilitating the removal of a pneumatic tire from a wheel assembly including a rim having a drop-center portion, oppositely disposed side walls and a tire bead receiving trough intermediate said drop-center portion and each of said side walls, and a disk-like center part having a centrally apertured portion off-set laterally with respect to said drop-center portion; a tire bead engaging share adapted to effect wedging entrance between the inner surface of a rim side wall and an outer surface of the tire for engagement with the adjacent bead whereby the latter is forced out of its trough and into said drop-center portion; a lever for actuating said share, a pivotally movable clamp adapted to extend radially inwardly with respect to said assembly and having a hook portion adapted to extend into the aperture of said center part, said hook having two recesses spaced in an axial direction for selectively receiving an edge portion of the wall bounding the aperture of said center part whereby said tool may be selectively anchored with respect to either side of said wheel assembly.

2. In a tool for facilitating the removal of a pneumatic tire from a wheel assembly including a rim having a drop-center portion, oppositely disposed side walls and ridges respectively cooperating with the latter to provide laterally spaced tire bead-receiving troughs, and a disk-like center part having a centrally apertured portion off-set laterally with respect to said rim drop-center portion; a tire bead engaging share adapted to effect wedging entrance between the inner surface of a rim side wall and an outer surface of the tire for engagement with the adjacent bead whereby the latter is forced over the adjacent ridge, an actuating lever for said share relatively rigid therewith, and a clamp pivotally connected with said lever and offset laterally with respect thereto, said clamp including a hook portion having a plurality of recesses spaced in an axial direction for selectively receiving an edge portion of the wall bounding said central aperture whereby said share is positioned for entrance between respectively adjacent rim and tire side walls and said tool may be selectively anchored with respect to either side of the wheel assembly.

GEORGE M. MEINZINGER.